United States Patent
Miyano

(10) Patent No.: US 7,251,094 B2
(45) Date of Patent: Jul. 31, 2007

(54) RECORDING MEDIUM APPARATUS

(75) Inventor: Toru Miyano, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 353 days.

(21) Appl. No.: 10/510,117

(22) PCT Filed: Dec. 17, 2003

(86) PCT No.: PCT/JP03/16136

§ 371 (c)(1),
(2), (4) Date: Oct. 4, 2004

(87) PCT Pub. No.: WO2004/057595

PCT Pub. Date: Jul. 8, 2004

(65) Prior Publication Data

US 2005/0219733 A1   Oct. 6, 2005

(30) Foreign Application Priority Data

Dec. 19, 2002  (JP) .............................. 2002-368407

(51) Int. Cl.
*G11B 21/02*  (2006.01)
*G11B 19/02*  (2006.01)
*G11B 27/36*  (2006.01)

(52) U.S. Cl. .............................. 360/75; 360/31; 360/69

(58) Field of Classification Search .................. None
See application file for complete search history.

(56) References Cited

U.S. PATENT DOCUMENTS 4,862,394 A * 8/1989 Thompson et al. .......... 702/166
6,453,266 B1 * 9/2002 Chainer et al. ............... 702/184
7,042,663 B2 * 5/2006 Shimotono et al. ........... 360/31

FOREIGN PATENT DOCUMENTS

| JP | 041-264627 | 9/1992 |
| JP | 2002-259066 A | 9/2002 |
| JP | 2002-343074 A | 11/2002 |

OTHER PUBLICATIONS

Japanese International Search Report for PCT/JP2003/16136, dated Feb. 24, 2004, (with English translation).
Microfilm of the specification and drawings annexed to the request of Japanese Utility Model Application No. 120389/1988 (Laid-open No. 042251/1990) (NEC Corp.), Mar. 23, 1990.

* cited by examiner

*Primary Examiner*—K. Wong
(74) *Attorney, Agent, or Firm*—RatnerPrestia

(57) ABSTRACT

A disk control apparatus includes a shock sensor detecting a shock applied to a disk portion performing data reading and writing on a hard disk, and a shock log data generation manager creating shock log data concerning the detected shock, based on a predetermined shock determination threshold value relating to the level of the shock.

13 Claims, 7 Drawing Sheets

Fig. 3

| Number of shock occurrences | Shock occurrence date | Shock occurrence time | Shock occurrence position | Shock occurrence operation mode | Actual shock value |
|---|---|---|---|---|---|
| 1st | August 30, 2002 | 14:03 | Kadoma-shi, Osaka-fu | Writing | 150Gs (X direction) 100Gs (Y direction) 50Gs (Z direction) |
| 2nd | September 10, 2002 | 9:30 | Ukyo-ku, Kyoto-fu | Idle | 350Gs (X direction) 200Gs (Y direction) 350Gs (Z direction) |
| | | | | | |
| | | | | | |
| | | | | | |

Fig. 4

|  | X direction | Y direction | Z direction |
|---|---|---|---|
| Writing | 100G | 100G | 70G |
| Reading | 120G | 120G | 90G |
| Idle | 250G | 250G | 200G |
| Power off | 400G | 400G | 300G |

RECORDING MEDIUM APPARATUS

TECHNICAL FIELD

The present invention relates to a shock history data creating apparatus and method, used, for example, for portable hard disk recorders and digital cameras.

BACKGROUND ART

There is a disk control apparatus storing information to indicate which component is to be diagnosed based on information on the error that occurred, and having the function of outputting information to enable a self-diagnosis of the cause of the occurrence of the error to be performed in a short time without the need for a skilled worker (for example, see Japanese Laid-Open Patent Application No. H04-264627).

The entire disclosure of Japanese Laid-Open Patent Application No. H04-264627 is incorporated herein by reference in its entirety.

Moreover, there is a disk control apparatus provided with a shock sensor and having the function of detecting a shock of not less than a predetermined level and stopping writing or the like.

The inventor considers that it frequently occurs that a failure on the disk portion occurs due to a shock applied through carelessness without the user being aware of it, not only in portable disk control apparatuses such as portable hard disk recorders and digital cameras, but also in stationary disk control apparatuses.

However, in conventional disk control apparatuses as described above, information clearly indicating that such a shock is applied cannot be obtained.

The inventor has noticed that for this reason, when a failure on the disk portion occurs, its cause can be correctly diagnosed only in few cases.

DISCLOSURE OF INVENTION

In view of the above-mentioned problem of conventional disk control apparatuses, an object of the present invention is to provide a shock history data creating apparatus capable of more reliably diagnosing the cause of, for example, a failure on the disk portion.

A first aspect of the present invention is a shock history data creating apparatus comprising:

shock detecting means of detecting a shock applied to data reading and writing means of performing data reading and/or writing on a predetermined recording medium, and/or the predetermined recording medium; and shock history data creating means of creating shock history data concerning the detected shock based on a predetermined shock level criterion relating to a level of the shock.

A second aspect of the present invention is a shock history data creating apparatus according to the first aspect of the present invention, further comprising:

a shock history data memory accumulating the created shock history data; and shock history data information external output means of outputting information on the accumulated shock history data to an outside at predetermining timing.

A third aspect of the present invention is a shock history data creating apparatus according to the first aspect of the present invention, further comprising control means of performing control relating to the data reading and/or writing based on a plurality of operation modes, wherein the shock level criterion is a criterion relating to a shock level determined for each of the operation modes.

A fourth aspect of the present invention is a shock history data creating apparatus according to the third aspect of the present invention, further comprising operation mode detecting means of detecting the operation mode, wherein the shock history data creating means writes information on the detected operation mode into the shock history data.

A fifth aspect of the present invention is a shock history data creating apparatus according to the first aspect of the present invention, further comprising reading/writing position detecting means of detecting a reading/writing position of the predetermined recording medium on which the data reading or writing is performed, wherein the shock history data creating means writes information on the detected reading/writing position into the shock history data.

A sixth aspect of the present invention is a shock history data creating apparatus according to the first aspect of the present invention, further comprising place time detecting means of detecting a place and/or time, wherein the shock history data creating means writes information on the detected place and/or time into the shock history data.

A seventh aspect of the present invention is a shock history data creating apparatus according to the first aspect of the present invention, further comprising shock level criterion changing means of changing the shock level criterion in accordance with an external instruction.

An eighth aspect of the present invention is a shock history data creating apparatus according to the first aspect of the present invention, wherein the shock level criterion is a criterion relating to a level of the shock determined for each of a plurality of predetermined directions.

A ninth aspect of the present invention is a shock history data creating apparatus according to the eighth aspect of the present invention, wherein the shock history data creating means writes information on the predetermined direction in which the shock is applied into the shock history data.

A tenth aspect of the present invention is a shock history data creating apparatus according to the eighth aspect of the present invention, wherein the predetermined recording medium is a hard disk, the data reading and writing means is a hard disk drive, the criterion relating to the level of the shock is a threshold value corresponding to an upper limit of the level of the shock that the hard disk and the hard disk drive can endure, and the threshold value determined with respect to a direction vertical to a surface of the hard disk is lower than the threshold value determined with respect to a direction parallel to the surface of the hard disk.

An eleventh aspect of the present invention is a shock history data creating apparatus according to the first aspect of the present invention, further comprising data reading and writing inhibiting means of inhibiting data reading and/or writing when the detected shock exceeds a predetermined limit.

A twelfth aspect of the present invention is a shock history data creating apparatus according to the first aspect of the present invention, further comprising:

a shock history data memory accumulating the created shock history data;

warning creating means of creating a warning relating to the detected shock based on the accumulated shock history data; and warning external output means of outputting the created warning to an outside at predetermined timing.

A thirteenth aspect of the present invention is a shock history data creating method comprising:

a shock detecting step of detecting a shock applied to data reading and writing means of performing data reading and/or writing on a predetermined recording medium, and/or the predetermined recording medium; and a shock history data creating step of creating shock history data concerning the detected shock based on a predetermined shock level criterion relating to a level of the shock.

A fourteenth aspect of the present invention is a program of causing a computer to execute the shock history data creating step, of the shock history data creating method of the thirteenth aspect of the present invention, of creating shock history data concerning the detected shock based on a predetermined shock level criterion relating to a level of the shock.

A fifteenth aspect of the present invention is a computer-processable recording medium holding the program of the fourteenth aspect of the present invention.

BRIEF DESCRIPTION OF DRAWINGS

FIG. 3 is a view showing shock log data of the embodiment of the present invention;

FIG. 4 is a view showing shock determination threshold values of the embodiment of the present invention;

Figure 1:
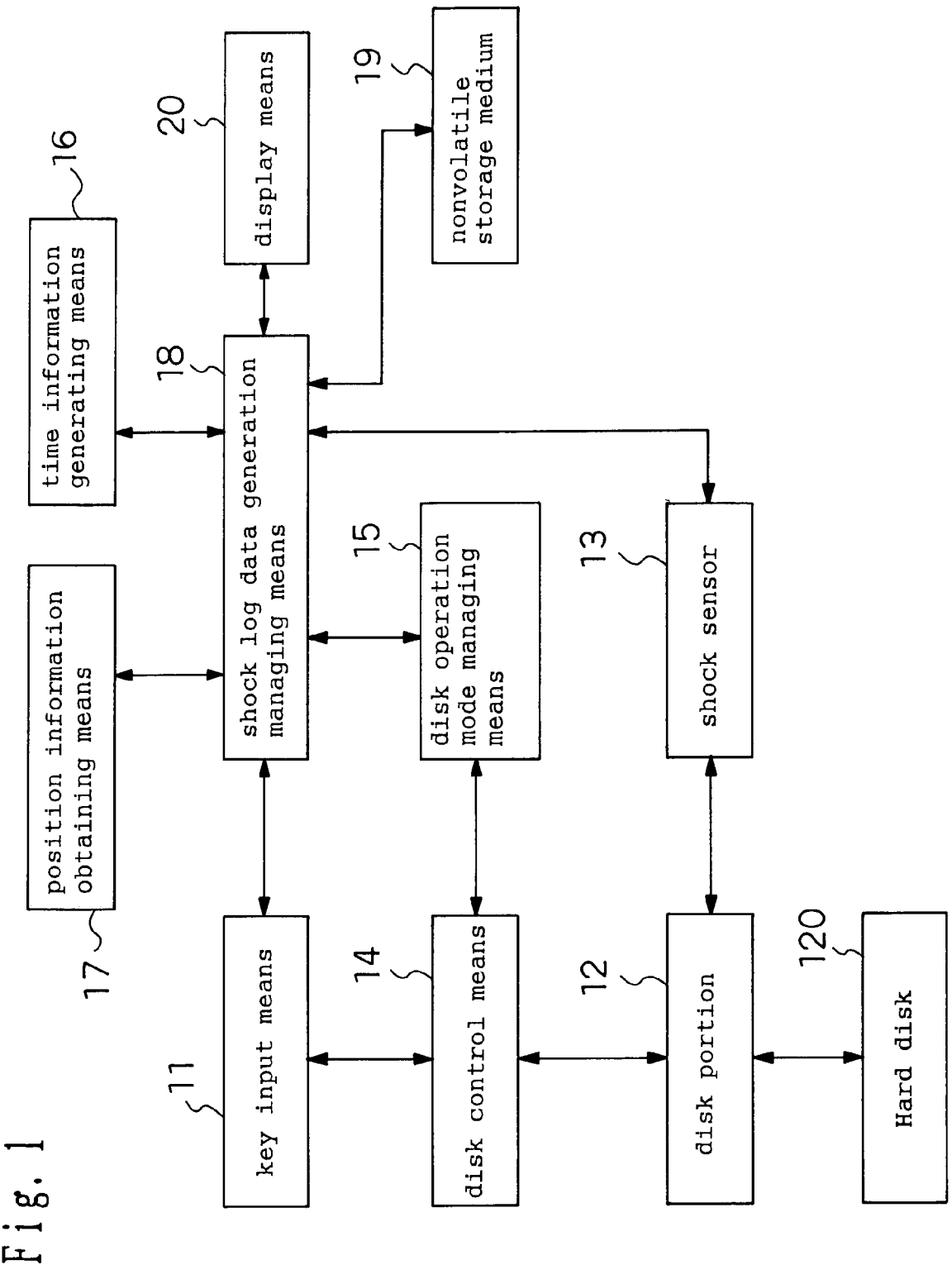
FIG. 1 is a view showing the structure of a disk control apparatus of an embodiment of the present invention.

EXPLANATION OF REFERENCE NUMERALS 11 key input means
12 disk portion
13 shock sensor
14 disk control means
15 disk operation mode managing means
16 time information generating means
17 position information obtaining means
19 shock log data generation managing means
19 nonvolatile storage medium
20 display means

BEST MODE FOR CARRYING OUT THE INVENTION

Hereinafter, an embodiment according to the present invention will be described with reference to the drawings.

First, the structure of a disk control apparatus of the embodiment of the present invention used for portable hard disk recorders, digital cameras, PDAs (personal digital associates), mobile telephones and the like will be described with reference mainly to FIG. 1 which is a view showing the structure of the disk control apparatus of the present embodiment.

The disk control apparatus of the present embodiment is provided with a shock sensor 13 detecting a shock applied to a disk portion 12 performing data reading and writing on a hard disk 120, and shock log data generation managing means 18 of generating shock log data concerning the detected shock based on a predetermined shock determination threshold value relating to the shock level.

Next, the structure of the disk control apparatus of the present embodiment will be described in more detail.

Key input means 11 is means of performing key input by a remote control unit, a main unit operation button or the like.

The disk portion 12 is means including a head 121 (see FIG. 2) of performing reading and writing of various kinds of data such as video signals and audio signals on the incorporated hard disk 120. That is, the disk portion 12 is a so-called hard disk drive.

Figure 2:
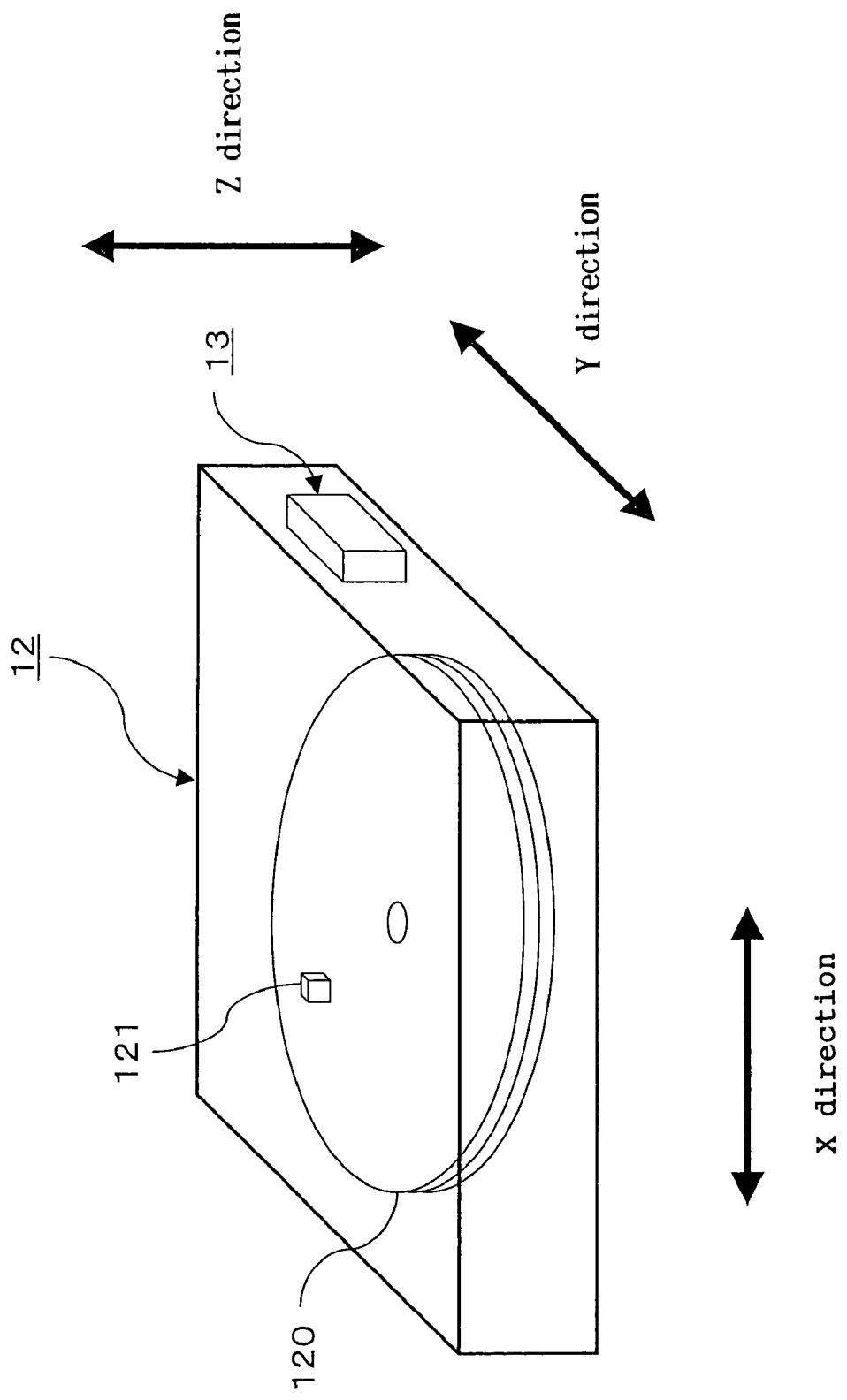
FIG. 2 is a view showing the outline of a disk portion 12 of the embodiment of the present invention.

The shock sensor 13 is means attached to the external wall of the housing of the disk portion 12 and having an acceleration sensor of detecting a shock applied to the disk portion 12 with respect to X, Y and Z directions orthogonal to one another as shown in FIG. 2 which is a view showing the outline of the disk portion 12 of the embodiment of the present invention.

Here, the acceleration sensor is means of converting the acceleration into an electric signal by use of a piezoelectric element or the like.

The X and Y directions are directions parallel to the surface of the hard disk 120, and the shock resistance of the disk portion 12 and the hard disk 120 is comparatively high with respect to these directions. The Z direction is a direction vertical to the surface of the hard disk 120, and the shock resistance of the disk portion 12 and the hard disk 120 is not very high with respect to this direction.

Disk control means 14 is means of performing data recording and reading control on the disk portion 12.

Disk operation mode managing means 15 is means of managing the disk operation mode (at the time of writing, at the time of reading, when the apparatus is idle, and when the power is off) in the disk control means 14.

Time information generating means 16 is means including a clock of generating the shock occurrence date and the shock occurrence time as time information.

Position information obtaining means 17 is means including a GPS (global positioning system) device of obtaining a pair of the latitude and longitude of the current position as position information and database holding the correspondence between the pair of the latitude and longitude and the place name.

The shock log data generation managing means 18 is means including a CPU (central processing unit) of performing generation and management of the shock log data at the time of occurrence of a shock on the disk portion 12 by use of information from the time information generating means 16, the position information obtaining means 17, the disk operation mode managing means 15, the shock sensor 13 and the like. Moreover, the shock log data generation managing means 18 is means of changing the above-mentioned shock determination threshold value at the time of hard disk replacement involved in storage capacity change service.

While the power supply to the shock log data generation managing means 18 may be performed by use of the main power source used for disk control in the disk control means 14, in the present embodiment, the power supply is performed by use of a backup power source used for memory retention in the disk portion 12. The use of the backup power source enables the generation and management of the shock log data to be executed at all times.

A nonvolatile storage medium 19 is means including a memory of storing the above-mentioned shock log data and shock determination threshold value.

Display means 20 is means including a display of displaying the above-mentioned shock log data and displaying a method of operation of changing a parameter value such as the shock determination threshold value.

Here, a concrete example of the above-mentioned shock log data will be described in more detail with reference to FIG. 3 which is a view showing shock log data of the embodiment of the present invention.

The information managed as the shock log data comprises: (a) the number of shock occurrences representative of the ordinal number of a shock of a level exceeding the shock determination threshold value since the start of recording of the shock log data; (b) the shock occurrence date representative of the year, month and day when the shock occurs; (c) the shock occurrence time representative of the hour and minute when the shock occurs; (d) the shock occurrence position representative of the place where the shock occurs; (e) a shock occurrence operation mode representative of the disk operation mode of the disk portion 12 when the shock occurs; and (f) the actual shock value, with respect to the X, Y and Z directions, obtained from the shock sensor 13 when the shock occurs.

Concrete examples of such information are (a) first, (b) Aug. 30, 2002, (c) 14:03, (d) Kadoma-shi, Osaka-fu, (e) at the time of writing, and (f) 150 Gs (X direction) 100 Gs (Y direction) and 50 Gs (Z direction).

The shock determination threshold value is a parameter representative of the upper limit of the guaranteed range of the shock resistance of the disk portion 12 and the hard disk 120, and is set with respect to the X, Y and Z directions for each disk operation mode at the time of shock occurrence.

More specifically, as shown in FIG. 4 which is a view showing the shock determination threshold values of the embodiment of the present invention, the shock determination threshold values with respect to the X, Y and Z directions at the time of writing are 100 Gs, 100 Gs and 70 Gs, respectively; the shock determination threshold values with respect to the X, Y and Z directions at the time of reading are 120 Gs, 120 Gs and 90 Gs, respectively; the shock determination threshold values with respect to the X, Y and Z directions when the apparatus is idle are 250 Gs, 250 Gs and 200 G, respectively; and the shock determination threshold values with respect to the X, Y and Z directions when the power is off are 400 Gs, 400 Gs and 300 Gs, respectively.

In the present embodiment, since the shock resistance is higher in the order of at the time of writing, at the time of reading, when the apparatus is idle and when the power is off, the shock determination threshold values are set to be higher in this order with respect to the same direction.

Moreover, in the present embodiment, since the shock resistance with respect to the X and Y directions is higher than that with respect to the Z direction, the shock determination threshold values with respect to the X and Y directions are set to be higher than that with respect to the Z direction in the same disk operation mode.

As described above, detecting the actual shock value with respect to each of the X, Y and Z directions increases the possibility that the cause of the failure of the hard disk 120 that occurred can be more accurately diagnosed.

It is considered that failures of the hard disk 120 are frequently caused by a collision between the hard disk 120 and the head 121 due to a shock.

Therefore, it is desirable that such setting of the shock determination threshold values in accordance with the disk operation mode and the X, Y and Z directions be performed in consideration of the characteristics of the disk portion 12 and the hard disk 120.

For example, when the shock resistance of the disk portion 12 and the hard disk 120 with respect to the X and Y directions is lower than that with respect to the Z direction, the shock determination threshold values with respect to the X and Y directions are set so as to be lower than that with respect to the Z direction. When the shock resistance of the disk portion 12 and the hard disk 120 is higher in the order of at the time of reading, at the time of writing, when the apparatus is idle and when the power is off, the shock determination threshold value is set so as to be higher in this order with respect to the same direction.

In the present embodiment, concrete information such as the shock occurrence time and the shock occurrence position is managed as the shock log data.

For example, the possibility that the user himself or herself can understand, by seeing the shock log data, that the cause of the failure is a shock applied by the user's misoperation such as a drop or a collision is high even when a failure occurs on the hard disk 120 after a considerable time has elapsed since the application of the shock.

The disk control apparatus of the present embodiment corresponds to the shock history data creating apparatus of the present invention.

The key input means 11 corresponds to the shock level criterion changing means of the present invention, the shock sensor 13 corresponds to the shock detecting means of the present invention, the disk control means 14 corresponds to the control means of the present invention, the disk operation mode managing means 15 corresponds to the operation mode detecting means of the present invention, means including the time information generating means 16 and the position information obtaining means 17 corresponds to the place and time detecting means of the present invention, the shock log data generation managing means 18 corresponds to the shock history data generating means of the present invention, the nonvolatile storage medium 19 corresponds to the shock history data memory of the present invention, and the display means 20 corresponds to the shock history data information external output means of the present invention.

The hard disk 120 corresponds to the predetermined recording medium of the present invention, and the disk portion 12 corresponds to the data reading and writing means of the present invention.

The shock determination threshold value of the present embodiment corresponds to the shock level criterion of the present invention, and the shock log data of the present embodiment corresponds to the shock history data of the present invention.

Next, the operation of the disk control apparatus of the present embodiment will be described.

An embodiment of the shock history data creating method of the present invention will also be described while the operation of the disk control apparatus of the present embodiment is described.

(1) Normal operation: The disk control means 14 detects key input information on disk control such as writing and reading on the disk portion 12 from the key input information inputted by the key input means 11.

The shock sensor 13 detects shocks on the disk portion 12 at all times, and obtains the actually occurring actual shock value.

The disk control means 14 controls the disk portion 12 in accordance with the above-mentioned key input information, and transmits the operation mode of the disk portion 12 to the disk operation mode managing means 15 as the disk operation mode information.

The shock log data generation managing means 18 compares, of the shock determination threshold values having been read out from the nonvolatile storage medium 19, the shock determination threshold value in accordance with the disk operation mode information that the shock log data generation managing means 18 is notified of by the disk operation mode managing means 15, with the actual shock value detected by the shock sensor 13.

Then, when the actual shock value is higher than the shock determination threshold value, the shock log data generation managing means 18 obtains the shock occurrence date and the shock occurrence time from the time information generating means 16 and obtains the shock occurrence position from the position information obtaining means 17 to generate shock log data.

Moreover, the shock log data generation managing means 18 newly writes the shock log data into the nonvolatile recording medium 19 to cause the display means 20 to indicate that a shock occurred for several seconds.

Figure 5:
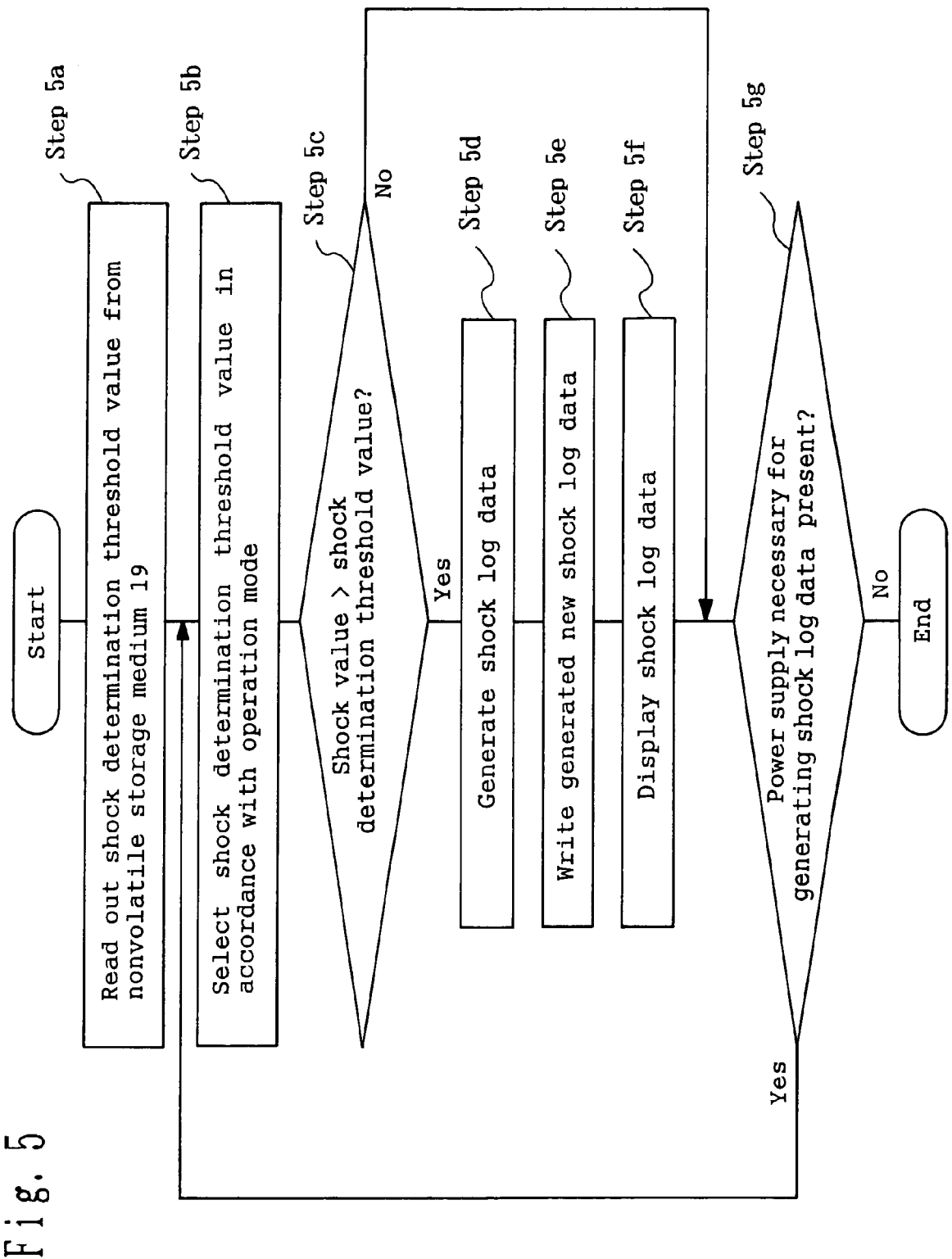
FIG. 5 is a view showing a flowchart concerning the generation of the shock log data of the embodiment of the present invention.

Now, the normal operation will be described in more detail with reference to FIG. 5 which is a flowchart concerning the generation of the shock log data.

The shock log data generation managing means 18 reads out the shock determination threshold value prestored in the nonvolatile storage medium 19 (step 5*a*).

As mentioned above, the shock determination threshold value is set for each disk operation mode.

Therefore, the shock log data generation managing means 18 selects and enters the shock determination threshold value to be used for the actual determination in accordance with the disk operation mode information obtained from the disk operation mode managing means 15 (step 5*b*), and compares the selected and entered shock determination threshold value with the actual shock value that the shock log data generation managing means 18 is notified of by the shock sensor 13 (step 5*c*).

Then, when determining that the actual shock value is higher than the shock determination threshold value, the shock log data generation managing means 18 obtains the shock occurrence date and the shock occurrence time from the time information generating means 16 and obtains the shock generation position from the position information obtaining means 17 to generate the shock log data (step 5*d*).

Moreover, the shock log data generation managing means 18 writes the generated new shock log data into the nonvolatile storage medium 19 (step 5*e*).

Moreover, the shock log data generation managing means 18 causes the display means 20 to display a shock occurrence message for several seconds (step 5*f*).

Then, the shock log data generation managing means 18 determines the presence or absence of power supply necessary for generating the shock log data.

When it is determined that power supply necessary for generating the shock log data is performed, the operations of the above-described steps 5*b* to 5*g* are repeated, and when it is not determined that such power supply is performed, the operation is ended.

When it is not determined that the actual shock value is higher than the shock determination threshold value (step 5*c*), the processing of step 5*g* is immediately performed without the operations of steps 5*d* to 5*f* being performed.

(2) Shock log data display operation: When key input information to request shock log data display in accordance with the user's key input is inputted through the key input means 11, the shock log data generation managing means 18 reads out the latest shock log data from the nonvolatile storage medium 19, and causes the display means 20 to display it.

Needless to say, when key input information to end the display is inputted through the key input means 11, the shock log data generation managing means 18 transmits a display end request to the display means 20 to end the display.

Figure 6:
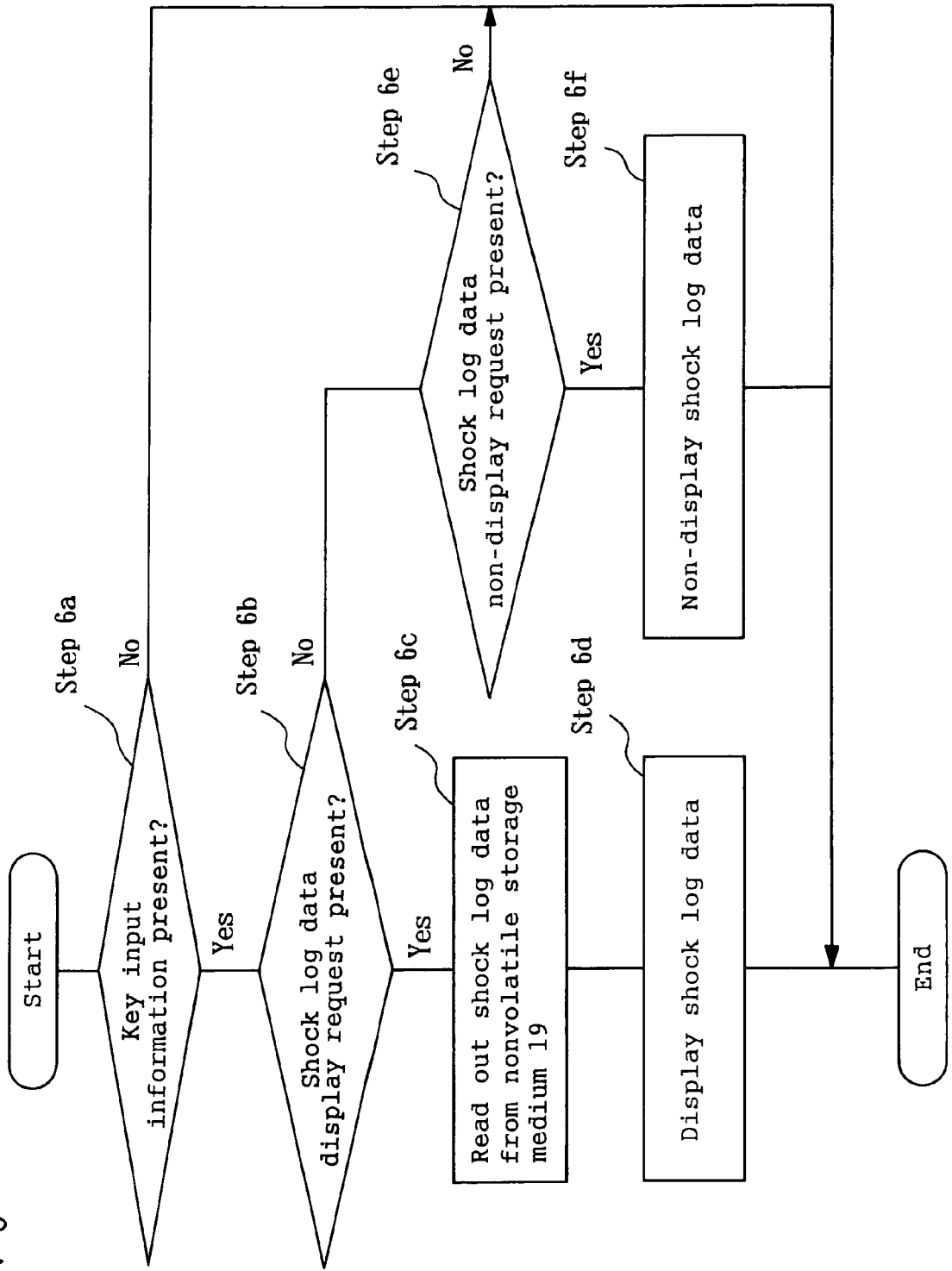
FIG. 6 is a view showing a flowchart concerning the display of the shock log data of the embodiment of the present invention.

Now, the shock log data display operation will be described in more detail with reference to FIG. 6 which is a flowchart concerning the display of the shock log data.

The shock log data generation managing means 18 determines whether key input information is present or not (step 6*a*), and when determining that key input information is present, determines whether it is key input information to display shock log data or not (step 6*b*).

When determining that key input information to display shock log data is inputted, the shock log data generation managing means 18 reads out the latest shock log data from the nonvolatile storage medium 19 (step 6*c*) and causes the display means 20 to display the latest shock log data being read out (step 6*d*).

On the other hand, when determining that key input information to display shock log data is not inputted, the shock log data generation managing means 18 determines whether the inputted input key information is key input information to end the display of the shock log data or not (step 6*e*). If so, the shock log data generation managing means 18 causes the display means 20 to end the display and then, ends the series of processing (step 6*f*), and if not, the shock log data generation managing means 18 ends the series of processing at once.

When it is not determined that key input information is present (step 6*a*), the processing is immediately ended without the operations of steps 6*b* to 6*f* being performed.

Moreover, when it is determined that the inputted key input information is not key input information to end the display of the shock log data (step 6*e*), the processing is also immediately ended without the operation of step 6*f* being performed.

(3) Shock determination threshold value change operation: When a special remote control code for changing shock determination threshold values is inputted through the key input means 11 at the time of hard disk replacement involved in storage capacity increase service or the like, the shock log data generation managing means 18 displays on the display means 20 the shock determination threshold value that is effective at that point of time, the operation method of changing the setting and the like.

At this time, the set value of the shock determination threshold value can be changed for each of the disk operation modes and each of the X, Y and Z directions in accordance with a manual operation such as a remote control key operation or a main unit button operation by the user who sees the display by the display means 20.

When a new shock determination threshold value is entered, the shock log data generation managing means 18 rewrites the shock determination threshold value prestored in the nonvolatile storage medium 19 to the entered new set value.

Figure 7:
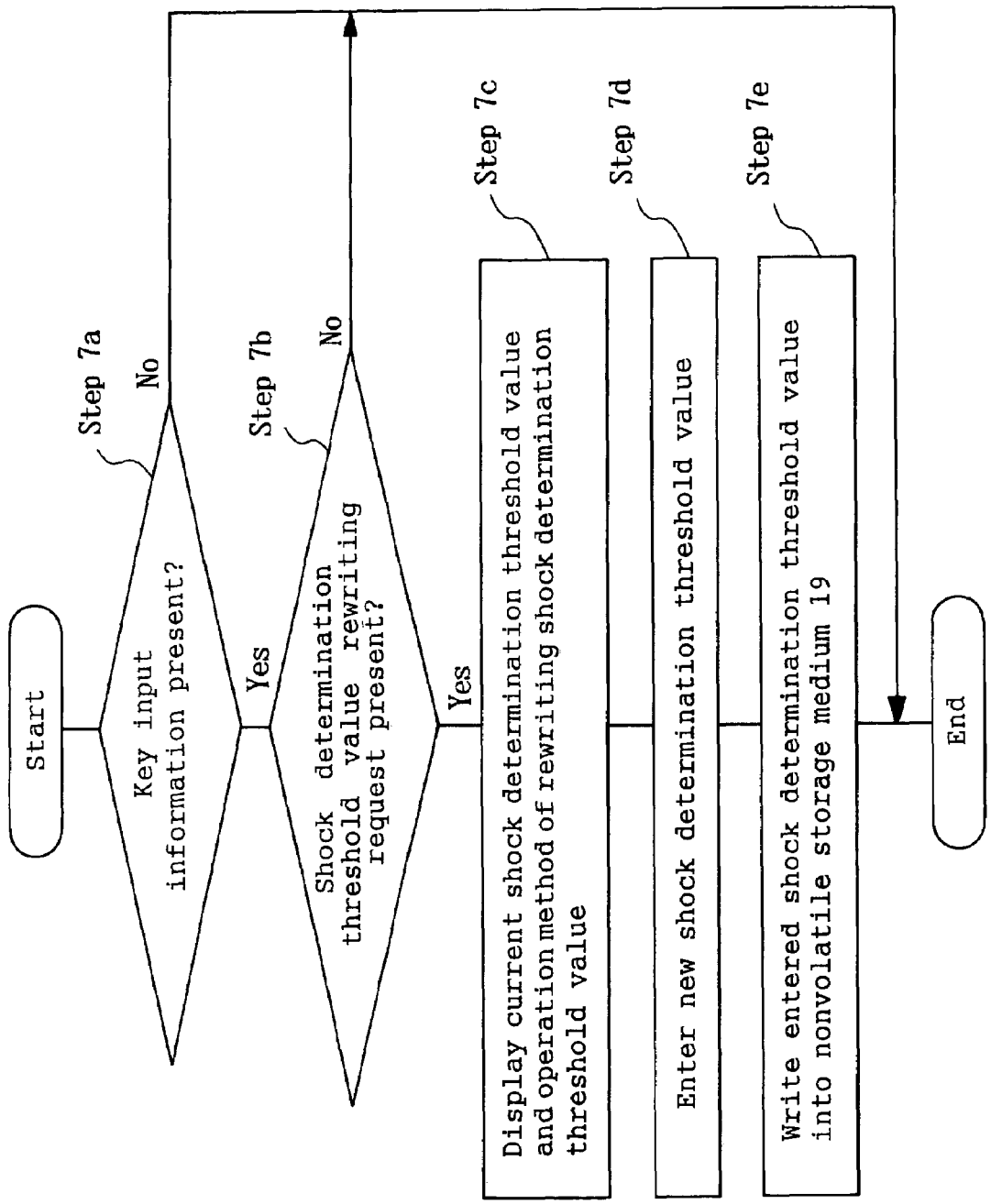
FIG. 7 is a view showing a flowchart concerning the change of the shock determination threshold value of the embodiment of the present invention.

Now, the shock determination threshold value change operation will be described in more detail with reference to FIG. 7 which is a flowchart concerning the change of the shock determination threshold value used when the shock log data is generated.

The shock log data generation managing means 18 determines whether the key input information by the key input means 11 is present or not (step 7a), and when determining that key input information is inputted, determines whether the inputted key information is a shock determination threshold value rewriting request or not (step 7b).

When determining that the key input information is a shock determination threshold value rewriting request, the shock log data generation managing means 18 causes the display means 20 to display the currently effective shock determination threshold value, the operation method of rewriting the shock determination threshold value and the like (step 7c).

When a new shock determination threshold value is entered in accordance with a manual operation by the user who sees the display (step 7d), the shock log data generation managing means 18 rewrites the entered new shock determination threshold value into the nonvolatile storage medium 19 (step 7e).

When it is not determined that key input information is present (step 7a), the processing is immediately ended without the operations of steps 7b to 7e being performed.

Moreover, when it is not determined that the inputted key input information is a shock determination threshold value rewriting request (step 7b), the processing is also immediately ended without the operations of steps 7c to 7e being performed.

In the above, the present invention is described in detail.

(A) The predetermined recording medium of the present invention is a hard disk 120 in the above-described present embodiment.

However, the present invention is not limited thereto; the predetermined recording medium of the present invention may be an optical disk, may be a removable medium such as a CD-R (compact disk-recordable) or a DVD-R (digital versatile disk-recordable), or may be a tape recording medium such as video tape.

(B) Moreover, the shock detecting means of the present invention is the shock sensor 13 detecting a shock applied to the disk portion 12 in the above-described present embodiment.

However, the present invention is not limited thereto; the shock detecting means of the present invention may be a shock sensor detecting a shock applied to the hard disk 120 which shock sensor is provided, for example, on the axis of rotation of a motor of rotating the hard disk 120, or may be a shock sensor detecting a shock applied to the disk portion 12 and the hard disk 120.

Since the disk portion 12 and the hard disk 120 are substantially integrated with each other, it is considered that a shock applied to the disk portion 12 and the hard disk 120 is detected after all also in the above-described present embodiment.

Since it is considered that failures of the hard disk 120 are frequently caused by a collision between the hard disk 120 and the head 121 due to a shock, it is desirable that the occurrence of a change in relative positional relationship between the hard disk 120 and the head 121 be detectable.

Needless to say, while the shock sensor 13 is attached to the external wall of the housing of the disk portion 12 in the above-described present embodiment, the present invention is not limited thereto; it may be attached to another means integrated with the disk portion 12 by screwing or the like.

(C) Moreover, the shock history data memory of the present invention is the nonvolatile storage medium 19 in the above-described present embodiment.

However, the present invention is not limited thereto; the shock history data memory of the present invention may be the hard disk 120.

However, in a case where a serious failure such that data reading and writing is disabled occurs on the disk portion 12, the shock log data stored on the hard disk 120 cannot be used, so that it becomes difficult to diagnose the cause of the failure. Therefore, it is more desirable to write shock log data in the nonvolatile storage medium 19 like in the above-described present embodiment.

(D) Moreover, the shock history data information external output means of the present invention is the display means 20 in the above-described present embodiment.

However, the present invention is not limited thereto; the shock history data information external output means of the present invention may be means including a sound output device of generating a warning beep or a guide announcement based on shock history data information to perform sound output, or may be means including a radio communication device transmitting information to a predetermined service center or the like by use of radio waves.

(E) Moreover, the place and time detecting means of the present invention is, in the above-described present embodiment, means including: the GPS device of obtaining as position information a pair of the latitude and longitude of the place where the apparatus is used; and the position information obtaining means 17 including a database holding the corresponding between the pair of the latitude and longitude and the place name.

However, the present invention is not limited thereto; the place and time detecting means of the present invention may be means not including such a database.

In such a case, for example, the above-mentioned database is constructed by use of a data server on the Internet or the like, and the association of the pair of the latitude and longitude with the place name may be performed by use of an inquiry made to the data server through a network or the like.

(F) Moreover, the shock history data creating apparatus of the present invention may further comprise reading/writing position detecting means of detecting the reading/writing position of a predetermined recording medium on which data reading or writing is performed, and the shock history data generating means of the present invention may write information on the detected reading/writing position into the shock history data.

For example, in the above-described embodiment, the following may be performed: The disk control means 14 detects the address of the reading/writing position of the hard disk 12 on which data reading or writing is performed, and the shock log data generation managing means 18 writes the address of the detected reading/writing position into the shock log data.

Needless to say, in such a case, the disk control means 14 corresponds to the reading/writing position detecting means of the present invention.

By the address information on the detected reading/writing position or the like being obtained when a shock is applied, a broken part can be more reliably identified.

(G) Moreover, the shock history data creating apparatus of the present invention may further comprise data reading and writing inhibiting means of inhibiting data reading and/or writing when the detected shock exceeds a predetermined limit.

For example, in the above-described present embodiment, when a shock with respect to the Z direction exceeds 350 Gs, the disk control means 14 may stop the operation of the disk portion 12 after writing the shock log data into the nonvolatile storage medium 19.

Needless to say, in such a case, the disk control means 14 corresponds to the data reading and writing inhibiting means of the present invention.

Moreover, the shock history data creating apparatus of the present invention may further comprise a shock history data memory accumulating created shock history data, warning creating means of creating a warning related to the detected shock based on the accumulated shock history data, and warning external output means of outputting the created warning to the outside at predetermined timing.

For example, in the above-described present embodiment, the following may be performed: the nonvolatile storage medium 19 accumulates the above-mentioned shock log data, the shock log data generation managing means 18 counts the cumulative sum of the number of shock occurrences and the cumulative sum of the actual shock value, and the display means 20 displays a message such that "Hard disk replacement is recommended" when the cumulative sum of the number of shock occurrences exceeds 30 or when the cumulative sum of the actual shock value with respect to any of the directions exceeds 10000 Gs.

Needless to say, in such a case, the nonvolatile storage medium 19 corresponds to the shock history data memory of the present invention, the shock log data generation managing means 18 corresponds to the warning creating means of the present invention, and the display means 20 corresponds to the warning external output means of the present invention.

(I) The program of the present invention is a program of causing a computer to execute the operations of all or some of the steps (or processes, operations, workings or the like) of the above-described shock history data creating method of the present invention, the program operating in concert with the computer.

Moreover, the recording medium of the present invention is a recording medium holding a program of causing a computer to execute all or some of the operations of all or some of the steps (or processes, operations, workings or the like) of the above-described shock history data creating method of the present invention, the recording medium being computer-readable and the program that is read out executing the operations in concert with the computer.

The above-mentioned "some of the steps (or processes, operations, workings or the like)" of the present invention means one or some steps of the plurality of steps.

Moreover, the above-mentioned "the operations of the steps (or processes, operations, workings or the like)" of the present invention means all or some operations of the steps.

Moreover, a usage of the program of the present invention may be such that the program is recorded on a computer-readable recording medium and operates in concert with a computer.

Moreover, a usage of the program of the present invention may be such that the program is transmitted over a transmission medium, is read out by a computer and operates in concert with the computer.

Moreover, the recording medium includes ROMs, and the transmission medium includes: transmission media such as the Internet; light; radio waves; and sound waves.

Moreover, the above-mentioned computer of the present invention is not limited to pure hardware such as a CPU, but may include firmware, an OS, and peripherals.

As described above, the structure of the present invention may be implemented either via software or via hardware.

By accumulating into the nonvolatile storage medium the shock log data concerning the shock caused while the disk control apparatus is used and reading out and displaying the shock log data in the nonvolatile storage medium as required in the manner described above, appropriate self-diagnosis information-can be provided with respect to the cause and the processing when a hard disk failure occurs. Moreover, in hard disk replacement such as storage capacity increase service, a parameter value such as the shock determination threshold value necessary for shock determination can be easily changed.

When a failure on the disk portion occurs, it can be more frequently determined that the cause of the failure is a shock applied by a fault such as a misoperation.

Moreover, since the user can understand that the shock which is the cause of the failure is caused by his or her own fault in many cases, the user's reluctance about the necessary remedy time and remedy cost can be reduced.

Needless to say, since the cause of a failure can be promptly diagnosed, the possibility increases that the remedy time and remedy cost themselves are suppressed.

The present invention has the advantage of being capable of more reliably diagnosing the cause, for example, when a failure on the disk portion occurs.

The invention claimed is:

1. A shock history data creating apparatus comprising:
   shock detecting means of detecting (a) a shock applied to data reading and writing means of performing data reading and/or writing on a predetermined recording medium, and/or (b) a shock applied to the predetermined recording medium;
   shock history data creating means of creating shock history data concerning the detected shock based on a predetermined shock level criterion relating to a level of the shock;
   a shock history data memory accumulating the created shock history data;
   shock history data information external output means of outputting information on the accumulated shock history data at predetermining timing; and
   place detecting means of detecting a place;
   wherein the shock history data creating means writes information on the detected place into the shock history data.

2. A shock history data creating apparatus according to claim 1, further comprising control means of performing control relating to the data reading and/or writing based on a plurality of operation modes,
   wherein the shock level criterion is a criterion relating to a shock level determined for each of the operation modes.

3. A shock history data creating apparatus according to claim 2, further comprising operation mode detecting means of detecting the operation mode,
   wherein the shock history data creating means writes information on the detected operation mode into the shock history data.

4. A shock history data creating apparatus according to claim 1, further comprising reading/writing position detecting means of detecting a reading/writing position of the predetermined recording medium on which the data reading or writing is performed, wherein the shock history data creating means writes information on the detected reading/writing position into the shock history data.

5. A shock history data creating apparatus according to claim 1, further comprising time detecting means of detecting a time,
wherein the shock history data creating means writes information on the detected time into the shock history data.

6. A shock history data creating apparatus according to claim 1, further comprising shock level criterion changing means of changing the shock level criterion in accordance with an external instruction.

7. A shock history data creating apparatus according to claim 1, wherein the shock level criterion is a criterion relating to a level of the shock determined for each of a plurality of predetermined directions.

8. A shock history data creating apparatus according to claim 7, wherein the shock history data creating means writes information on the predetermined direction in which the shock is applied into the shock history data.

9. A shock history data creating apparatus according to claim 7, wherein the predetermined recording medium is a hard disk,
the data reading and writing means is a hard disk drive,
the shock level criterion is a threshold value corresponding to an upper limit of the level of the shock that the hard disk and the hard disk drive can endure, and
the threshold value determined with respect to a direction vertical to a surface of the hard disk is lower than the threshold value determined with respect to a direction parallel to the surface of the hard disk.

10. A shock history data creating apparatus according to claim 1, further comprising data reading and writing inhibiting means of inhibiting data reading and/or writing when the detected shock exceeds a predetermined limit.

11. A shock history data creating apparatus according to claim 1, further comprising:
warning creating means of creating a warning relating to the detected shock based on the accumulated shock history data; and
warning external output means of outputting the created warning at predetermined timing.

12. A shock history data creating method comprising:
a shock detecting step of detecting (a) a shock applied to data reading and writing means of performing data reading and/or writing on a predetermined recording medium, and/or (b) a shock applied to the predetermined recording medium;
a shock history data creating step of creating shock history data concerning the detected shock based on a predetermined shock level criterion relating to a level of the shock;
a shock history data accumulating step for accumulating the created shock history data;
an outputting step of outputting information on the accumulated shock history data at predetermining timing; and
a place detecting step of detecting a place;
wherein the shock history data creating step includes writing information on the detected place into the shock history data.

13. A computer readable medium including a program for causing a computer to execute the steps of:
a shock detecting step of detecting (a) a shock applied to data reading and writing means of performing data reading and/or writing on a predetermined recording medium, and/or (b) a shock applied to the predetermined recording medium;
a shock history data creating step of creating shock history data concerning the detected shock based on a predetermined shock level criterion relating to a level of the shock;
a shock history data accumulating steo for accumulating the created shock history data; and
an outputting step of outputting information on the accumulated shock history data at predetermining timing; and
a place detecting step of detecting a place;
wherein the shock history data creating step includes writing information on the detected place into the shock history data.

* * * * *

UNITED STATES PATENT AND TRADEMARK OFFICE
CERTIFICATE OF CORRECTION

PATENT NO. : 7,251,094 B2  Page 1 of 1
APPLICATION NO. : 10/510117
DATED : July 31, 2007
INVENTOR(S) : Toru Miyano It is certified that error appears in the above-identified patent and that said Letters Patent is hereby corrected as shown below:

Claim 13, column 14, line 32, should read:

--…accumulating step…--

Signed and Sealed this

Twenty-fifth Day of December, 2007

JON W. DUDAS
*Director of the United States Patent and Trademark Office*